United States Patent [19]
Suganuma et al.

[11] 4,203,743
[45] May 20, 1980

[54] METHOD OF PRODUCING OPTICAL FIBER

[75] Inventors: Tsuneo Suganuma, Tokorozawa; Koji Ishida, Tokyo; Shin Satoh, Iruma; Mamoru Sugie, Hachioji; Toshio Katsuyama, Kokubunji; Gyozo Toda, Hino, all of Japan

[73] Assignee: Hitachi, Ltd., Japan

[21] Appl. No.: 933,672

[22] Filed: Aug. 14, 1978

Related U.S. Application Data

[63] Continuation of Ser. No. 832,900, Sep. 13, 1977, abandoned.

[30] Foreign Application Priority Data

Sep. 20, 1976 [JP] Japan ............................. 51-111864
Feb. 14, 1977 [JP] Japan ............................. 52-14270

[51] Int. Cl.² .......................................... C03B 37/02
[52] U.S. Cl. ........................................ 65/3 A; 65/13; 427/163
[58] Field of Search ............ 65/3 A, 2, 13, DIG. 7; 427/163, 167

[56] References Cited
U.S. PATENT DOCUMENTS

3,961,926  6/1976  Asam ........................... 65/3 A

OTHER PUBLICATIONS

"Optical fibers based on phosphosilicate glass", Gambling et al., Proceedings of IEE, vol. 123 #6, pp. 570–576, Jun. 1976.

*Primary Examiner*—Robert L. Lindsay, Jr.
*Attorney, Agent, or Firm*—Craig and Antonelli

[57] ABSTRACT

A method of producing an optical fiber comprising (i) the step of depositing a glass film of desired refractive index onto the inner wall surface of a quartz tube by the CVD (chemical vapor deposition) process, (ii) the step of heating the quartz tube to a high temperature while the gas of a compound which forms an oxide, enhancing the refractive index of the glass film, in an oxidizing atmosphere at the high temperature is kept flowing into the quartz tube along with an oxidizing gas, (iii) the step of heating and collapsing the quartz tube into a solid rod or the so-called preform, and (iv) the step of heating and drawing the optical fiber preform into the optical fiber.

In the optical fiber produced by this method of manufacture, the lowering of the refractive index of the central part of the optical fiber is sharply reduced.

At the step (iii), one end of the quartz tube is sealed and a gas is introduced into the tube from the other end so as to slightly raise the internal pressure of the tube, whereby a more favorable result is obtained.

20 Claims, 6 Drawing Figures

METHOD OF PRODUCING OPTICAL FIBER

This is a continuation of application Ser. No. 832,900 filed Sept. 13, 1977 now abandoned.

BACKGROUND OF THE INVENTION (i) Field of the Invention

This invention relates to a method of producing optical fiber by a chemical vapor reaction. More particularly, it relates to a method of producing optical fiber of excellent transmission characteristics by suppressing degradation in the refractive index of the central part of the optical fiber, the degradation being one of the problems inherent to the method of producing optical fiber exploiting a chemical vapor reaction.

(ii) Brief Description of the Prior Art

Among methods of producing optical fiber which is a transmission medium for the optical communication, the so-called CVD techniques wherein a chemical vapor reaction is exploited possess such a large number of merits that optical fiber having any desired distribution of refractive indices can be fabricated and having low transmission loss can be obtained.

As one of the CVD techniques, the MCVD technique is known wherein a cladding and a core or a glass film to serve as a core are deposited onto the inner wall surface of a glass tube made of quartz or the like, the glass tube is subsequently heated to collapse its hollow portion, thereby to make an optical fiber preform in the shape of a rod, and the optical fiber preform is heated and drawn into the optical fiber. One of problems in this MCVD technique is that, since the deposited glass film contains, besides for example $SiO_2$, a dopant for controlling the refractive index such as $B_2O_3$, $TiO_2$, $P_2O_5$ and $GeO_2$, the dopant added to the glass film vaporizes in heating and collapsing the hollow glass tube with the deposited glass film into the solid rod. The vaporization of the dopant results in lowering in the refractive index at the central part of the optical fiber and exerts bad effects on the transmission characteristics of the optical fiber.

In a prior-art method of manufacturing optical fiber on the basis of the MCVD technique, a core or a cladding and a glass film for a core is/are deposited to a predetermined thickness on the inner wall surface of a glass tube by exploiting a chemical vapor reaction. Subsequently, the glass tube having the CVD glass film is heated and collapsed, so that the hollow portion may become solid, into a preform in the shape of a rod. The preform thus obtained is heated and drawn into the optical fiber having an outside diameter of about 100 microns. In general, the refractive index distribution in a section of the optical fiber is similar to that in a section of the preform. The thermal diffusion etc. of the dopant hardly takes place in the drawing step of manufacture. The degradation of the refractive index at the central part of the optical fiber fabricated by the CVD process has occurred already in the preform making step. The lowering of the refractive index at the central part of the optical fiber will be ascribable to the fact that, as previously stated, the dopant vaporizes from the surface of the glass for the core in the step of heating and collapsing the hollow glass tube after the chemical vapor deposition. According to a study by the inventors, the dopant is susceptible to vaporization at the heating temperature during the collapsing and the density of the deposited glass film. This is considered to verify that the dopant vaporizes from the inner wall of the hollow glass tube subjected to the CVD, due to the heating during the collapsing, and that it diffuses within the CVD glass film.

In a prior-art method of collapsing, the hollow glass tube is collapsed into the solid rod in such a way that the feed of a reaction gas into the glass tube is stopped upon completion of the CVD, and that while letting an oxidizing or inert gas to flow into the tube or after filling the interior of the tube with the gas, the heating temperature is further raised. In this case, the glass film subjected to the CVD at a comparatively low temperature has not undergone a sufficient densification. When, in that state, the glass film is immediately heated by the raised temperature of the collapsing step, the dopant vaporizes in large quantities and over an extensive area of the CVD film. As the result, the optical fiber preform based on the prior-art method involves an extensive and considerable lowering of the refractive index at the central part thereof and has bad influences on the transmission characteristics of the optical fiber drawn therefrom.

As known techniques close to this invention, there are inventions disclosed in the official gazettes of Japanese Patent Application Public-disclosures Nos. 50-120352, 50-51338 and 51-3650.

SUMMARY OF THE INVENTION

It is an object of this invention to eliminate the difficulties of the prior art described above and to provide a method of easily producing an optical fiber of excellent transmission characteristics, with the lowering of the refractive index at its central part suppressed.

Another object of this invention is to provide a method of easily producing an optical fiber preform for use in the production of the aforecited excellent optical fiber.

Still another object of this invention is to provide a method wherein the vaporization of a dopant for enhancing the refractive index, as takes place in the step of heating and collapsing a glass tube, is suppressed and compensated for, thereby to produce optical fiber of excellent transmission characteristics.

On the basis of the fact found out by the inventors that the vaporization of the dopant is dependent upon the heating temperature during the collapsing of a hollow glass tube after the step of CVD, when the glass tube has a deposited glass film, and also upon the density of the deposited glass film, this invention conducts a heat treatment before the heating for the collapsing and while a compound gas, from which an oxide enhancing the refractive index of the glass film is precipitated by the CVD process, is kept flowing through the hollow glass tube having the deposited glass film, thereby to densify the deposited glass film and to suppress and compensate for the evaporation of the dopant from the core material, thus intending to reduce the lowering of the refractive index at the central part of an optical fiber preform, in its turn, the same at the central part of optical fiber.

In order to accomplish the objects, the method of producing optical fiber according to this invention comprises (i) the step of depositing a glass film onto the inner wall surface of a glass tube by a chemical vapor reaction, the glass film becoming 'a core' or 'a cladding and a core' of the optical fiber and having a refractive index or a distribution of refractive indices as desired, (ii) the step of heating the glass tube after completion of the step (i) to a high temperature while the gas of a compound which forms an oxide, enhancing the refractive index of the glass film, in an oxidizing atmosphere at the high temperature is kept flowing through the glass tube along with an oxidizing gas, (iii) the step of heating and collapsing the glass tube after completion of the step (ii), to obtain a solid optical fiber preform in the shape of a rod, and (iv) the step of heating and drawing the optical fiber preform to obtain the optical fiber.

The optical fiber manufactured by the above method of production has the lowering of the refractive index of its central part diminished sharply, and is remarkably improved in the transmission characteristics, especially the transmission bandwidth.

When, in the step (iii), the heating and collapsing is carried out under the state under which the pressure in the glass tube is slightly raised by sealing one end of the glass tube and introducing a gas into the tube from the other end, the degradation of the refractive index of the central part of the optical fiber to be obtained is further diminished, and a more favorable result is achieved. This expedient is also effective to prevent the sectional shape of the optical fiber to-be-obtained from deviating from a true circle.

The step (i) is notoriously known in the pertinent art as a technique of producing optical fiber with the CVD process. Also in this invention, the known technique may be employed as it is. In this case, a quartz tube is usually used as the glass tube. As a dopant which is contained in the glass film to be deposited, it is common practice to use oxides of B, Ge, P, Ti, F, Ba, Al etc. singly or in combination.

The heating temperature in the step (ii) shall, in the case of using the quartz tube, lie within a temperature range of about 1400°–1500° C. in terms of a measured value obtained with an optical pyrometer. Although, in this step (ii), the outside diameter of the glass tube decreases slightly, it is essentially different from the step (iii) for rendering the hollow portion of the glass tube solid. When the heating temperature is higher than the specified temperature range, unpreferably the glass tube shows a tendency to collapse. On the other hand, when the heating temperature is lower than the range, unpreferably the densification of the deposited glass film is insufficient.

As a heating source in the step (ii), a burner, especially oxyhydrogen burner, or an electric furnace is employed, and usually a heating source having been employed in the step (i) is used without any change. The heating method is as illustrated in FIG. 1. More specifically, while rotating a glass tube 2 (either direction will do for the rotation), a heating source 3 is moved in a direction 6 (alternatively, the glass tube is moved in a direction 6'). When the heating source has arrived at the vicinity of one end of the glass tube (the position of the arrival is not always restricted to the tube end, but it may be a desired position), the heating source 3 is moved in the direction 6' (alternatively, the glass tube is moved in the direction 6). Upon return of the heating source to the starting position, the movement thereof in the direction 6 is repeated again. In this way, while rotating the glass tube the heating source is reciprocated a required number of times so as to heat the glass tube. The rotation of the glass tube must be executed in case where the heating source is the burner, but it is not always necessary in cases where the heating source is an electric furnace. The aforecited direction 6 agrees with the direction of the gas flowing through the glass tube.

The speed of rotation of the glass tube is usually made 10–60 r.p.m. However, insofar as this speed lies within a range of rotational speeds which is generally used in the well-known step (i), no problem is posed.

The speed of movement of the heating source in the direction 6 in the step (ii) shall be made 1–5 mm/sec. Below 1 mm/sec., an unnecessarily long time is required, and above 5 mm/sec., the control of the heating temperature becomes difficult and besides the temperature gradient between the outer and inner sides of the glass tube becomes large, so that both the cases are unpreferable. The speed of movement of the heating source in the direction 6' shall be made 10 mm/sec. or above. At a speed below 10 mm/sec., unpreferably the dopant is feared to precipitate.

The number of times of reciprocation of the glass tube in the step (ii) shall be made 10 or below. Even when the number of times of reciprocation is small, an effect is appreciable over a case where the step (ii) is not carried out. However, when the times of reciprocation exceed 10, unpreferably the compensation of the vaporized dopant is prone to be excessive. Usually, 3–10 times are favorable.

The compound gas in the step (ii) may be any that is employed in order to raise the refractive index of a glass film in the well-known techniques of producing optical fiber by the use of the CVD process. For example, $GeCl_4$, $PCl_3$, $POCl_3$, $TiCl_4$, $AlCl_3$ etc. are employed. They may be used either singly or as a mixture thereof.

As the oxidizing gas in the step (ii), oxygen is employed. Its flow rate in the glass tube may fall in a range of flow rates which is specified in the well-known techniques of producing optical fiber by the use of the CVD process.

In order to let the compound gas flow into the glass tube, oxygen may be blown into the liquid compound at, e.g., 20° C. as received in a bubbler, and a mixture gas consisting of the compound and oxygen may be introduced into the glass tube.

In this case, the quantity of oxygen to be blown in shall be 1–10 cc/min. when the inside diameter of the glass tube is 12 mm and when $GeCl_4$ is used. When the inside diameter of the glass tube is not 12 mm, the quantity of oxygen to be blown in may be increased or decreased in proportion to the inside diameter. When the temperature of the compound liquid in the bubbler is not 20° C., the quantity of oxygen to be blown in may be increased or decreased in inverse proportion to the vapor pressure of the compound at the particular temperature. If the quantity of oxygen blown in is below 1 cc/min., the effect will be unsatisfactory, and if it is above 10 cc/min., the compensation of the dopant vaporized from the glass film will be excessive, so that both the cases are unpreferable.

The heating source in the step (iii) may be one mentioned in the explanation of the step (ii), and the same heating source as in the step (ii) is ordinarily used. A heating method in the step (iii) is similar to that in the step (ii). However, the moving speed of the heating source shall be 0.05–1 mm/sec. in one direction, and fast in the other direction so as to prevent collapsing. The number of times of reciprocation shall be 2 or more, desirably 2 or 3. When the moving speed is below 0.05 mm/sec., the required time is long, which is unpractical. When it is above 1 mm/sec., the collapsing is feared to become insufficient. Therefore, both the cases are unpreferable.

When the heating and collapsing is done by one reciprocation, unpreferably the sectional shape of the optical fiber preform obtained tends to deviate from a true circle. Although the number of times of reciprocation may be large, 2-3 times are ordinarily satisfactory, and 4 or more times is uneconomical.

The heating temperature in the step (iii) shall, in the case of employing the quartz tube, lie in a temperature range of about 1550°–1650° C. in terms of a measured value obtained with an optical pyrometer. When the heating temperature is higher than this temperature range, the glass tube collapses and fuses by moving the heating source only once. The drawback in the case where the glass tube is collapsed by the single reciprocation has been stated previously. When the heating temperature is lower than the temperature range, unpreferably the glass tube tends to become difficult to collapse and fuse.

As the gas which is introduced into the glass tube in the step (iii), oxygen is employed. The other items in the step (iii) are the same as in the step (ii).

In case where the heating and collapsing is carried out in the step (iii) with the internal pressure of the glass tube especially raised slightly, the pressure p (kg/cm$^2$) of the oxygen in the glass tube shall be set at a value calculated by the following equation:

$$p = k/r$$

where r denotes ½ of the inside diameter (cm) of the glass tube, and k a constant. The value of the constant shall be made $7.5 \times 10^{-4}$ (kg/cm) or below, and is usually made $6 \times 10^{-4}$ or so. When the value of the constant k exceeds $7.5 \times 10^{-4}$, unpreferably the glass tube shows a tendency to bulge. The heating source is moved at a speed of 0.05–1 mm/sec. in the direction 6', and rapidly in the direction 6 so as to prevent the collapsing.

The step (iv) is notoriously known in the pertinent art as a technique of producing optical fiber by heating and drawing an optical fiber preform. Also in this invention, the known technique may be employed as it is. If necessary, a drawing method which is described in a pending U.S. patent application (Ser. No. 744,454, filed Nov. 23, 1976) and a pending West-German patent application (Application No. P 26 53 836.3-45) may be adopted.

In the optical fiber manufactured by the method of this invention as set forth above, the undesirable lowering of the refractive index of the central part thereof is sharply reduced.

DETAILED DESCRIPTION OF THE PRESENTLY PREFERRED EMBODIMENTS

Example 1

Figure 1:
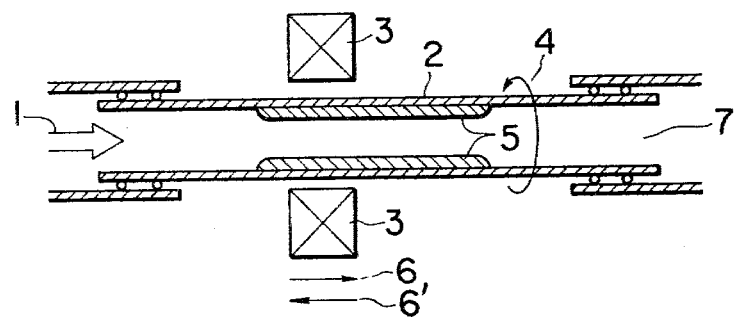
FIG. 1 is a schematic sectional view for explaining the essential parts of apparatus for producing optical fiber which is used in prior arts and in the method of this invention.

FIG. 1 is a view for elucidating the essential parts of apparatus which has been used in prior-art methods of producing optical fiber by exploiting the MCVD technique. Also in this invention, the apparatus shown in FIG. 1 can be used as it is. Hereunder, this example will be described with reference to FIG. 1.

A quartz tube (14 mm in the outside diameter, 1 mm in the wall thickness, and 120 cm in the total length) was used as a hollow glass tube 2 (a Vycor tube etc. can usually be employed besides the quartz tube). While rotating it on a glass lathe and at 40 r.p.m. in the direction of arrow 4 (or in the opposite direction), a source gas for forming a glass film was introduced into the quartz tube 2 as indicated by arrow 1, and a heating source 3 externally provided (an electric furnace, an oxyhydrogen burner etc. can be employed) was reciprocated in the directions of arrows 6 and 6'. Thus, the glass film 5 become a core material of optical fiber was deposited onto the inner wall surface of the quartz tube 2. In the present example, the vapors of SiCl$_4$, BBr$_3$ and GeCl$_4$ as mixed with oxygen gas were used as the source gas for forming the glass film. SiCl$_4$, BB$_3$ and GeCl$_4$ were received in bubblers held at 20° C., respectively. SiCl$_4$ was bubbled by passing oxygen therethrough at a rate of 120 cc/min., while BBr$_3$ was bubbled by passing oxygen therethrough at a rate of 90 cc/min. GeCl$_4$ was bubbled by passing oxygen therethrough in a range of 0–90 cc/min. according to a prearranged program. In addition, oxygen at a rate of 300 cc/min. was used as a carrier gas. Using an oxyhydrogen burner as the heating source 3, the quartz tube 2 was heated to 1100° C. (in a value obtained with an optical pyrometer) and was reciprocated 30 times. In this case, the moving speeds in the directions of arrows 6 and 6' were 2.5 mm/sec. and 15 mm/sec., respectively. In this way, the GeO$_2$—B$_2$O$_3$—SiO$_2$ glass film 5 (exhibiting a specific refractive index difference of −0.24 to 0.30% with respect to quartz) was deposited to a thickness of about 200 microns on the inner wall surface of the quartz tube.

Subsequently, before the collapsing and fusion of the quartz tube 2 with the glass film 5 deposited by the CVD, the supply of the reaction gas to the quartz tube 2 was stopped. While bubbling only GeCl$_4$ with oxygen at 7 cc/min. and separately feeding oxygen at 600 cc/min. as a carrier gas, the quartz tube 2 was heated by the oxyhydrogen burner 3. At this time, the heating power of the burner was made more intense than at the CVD of the preceding step, and the burner was reciprocated five times at a treatment temperature of 1450°–1480° C. (in a value measured with the optical pyrometer). The moving speeds of the burner 3 in the directions of arrows 6 and 6' in this case were the same as those at the CVD. In this preheating treatment previous to the collapsing and fusion of the quartz tube subjected to the CVD, the outside diameter of the quartz tube somewhat decreases. The treatment, however, is different from the next step, the so-called collapsing step of rendering the hollow portion solid.

Subsequently, in conformity with the prior-art collapsing method previously described, the quartz tube subjected to the CVD was heated and collapsed so that its cross section might become perfectly solid, whereby a preform for an optical fiber was fabricated. Typical collapsing conditions in the prior-art method were 0.6 mm/sec. as the burner moving speed (in the direction of arrow 6') and 1600° C. (in a value obtained with the optical pyrometer) as the heating temperature, and 0.2 mm/sec. (in the direction of arrow 6') and 1650° C. The burner was moved rapidly in the direction 6. In this case, the burner was reciprocated twice. After the first reciprocation of the burner, the fore end of the quartz tube 2 fused and closed naturally. During the second reciprocation of the burner, therefore, the internal pressure of the quartz tube was higher than the atmospheric pressure by about $1 \times 10^{-3}$ kg/cm$^2$. The gas introduced into the quartz tube was oxygen.

The preform thus fabricated was heated and drawn by the use of an electric furnace, whereby an optical fiber according to this invention having an outside diameter of 120 microns was obtained.

Figure 2:
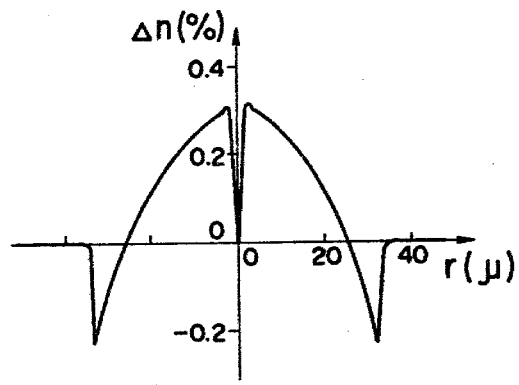
FIG. 2 is a graph showing the index profile of an optical fiber section obtained by a method according to one embodiment of this invention.
Figure 3:
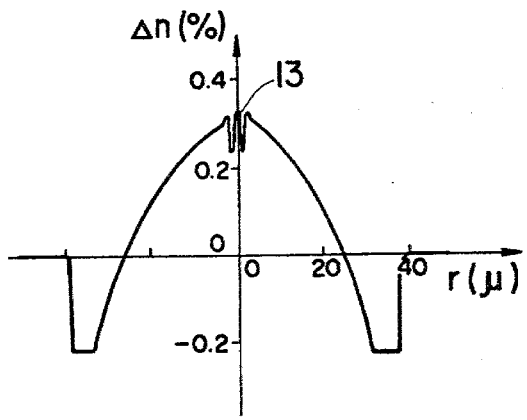
FIG. 3 is a graph showing the index profile of an optical fiber section obtained by a method according to another embodiment of this invention.

The refractive index profile of a section of the optical fiber manufactured in this way was measured with an interference microscope, and the result is given in FIG. 2. In FIG. 2 and FIGS. 4 to 6, and also in FIG. 3, to be referred to later, the axis of ordinates $\Delta n$ represents the relative index difference (%) with respect to quartz, while the axis of abscissas r represents the radial direction ($\mu$m) from the center of the optical fiber section.

Figure 4:
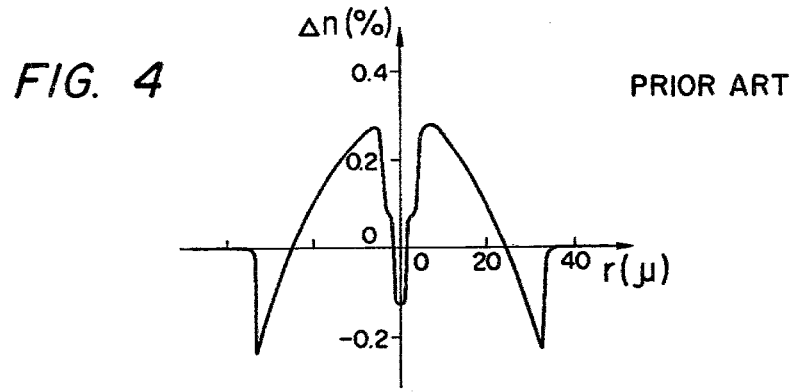
FIGS. 4–6 are graphs showing the index profiles of optical fiber sections obtained by prior-art methods.
Figure 5:
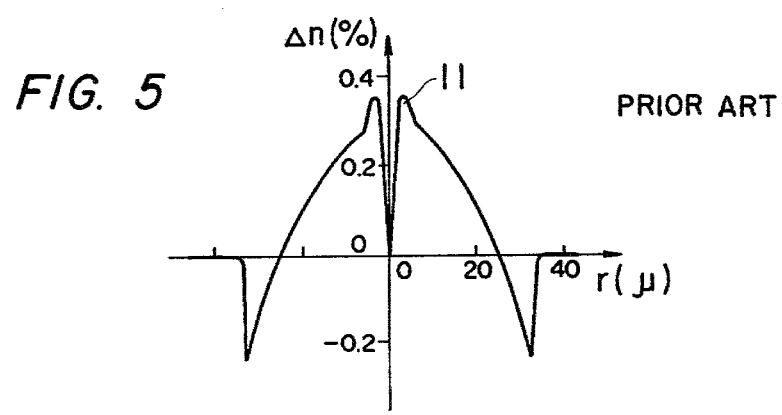
Figure 6:
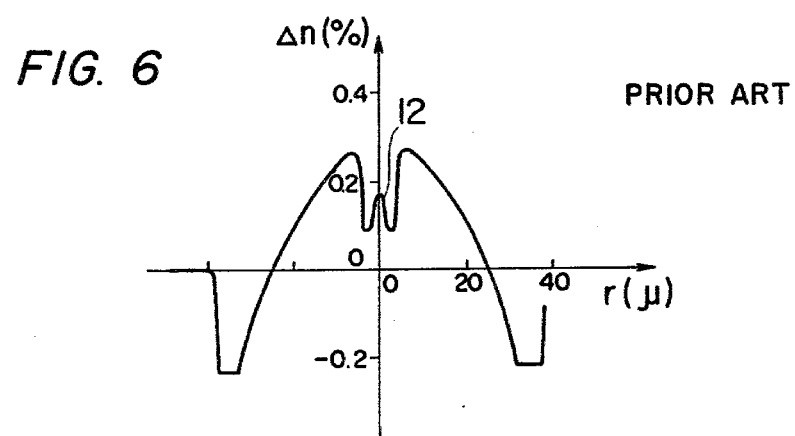

FIGS. 4 to 6 show results of measurements on optical fibers obtained by prior-art methods, the measurements having been conducted for comparisons. FIG. 4 corresponds to a case where the preheating treatment (i.e., the foregoing step (ii)) prior to the collapsing step was not carried out and where the collapsing and fusion (the step (iii)) was carried out immediately after the CVD in the step (i). FIG. 5 corresponds to a case where, as in the case of FIG. 4, the preheating treatment prior to the collapsing step was not carried out and the collapsing and fusion was carried out immediately after the CVD in the step (i), but where GeCl$_4$ was passed through the quartz tube during the first reciprocation of the heating source in the collapsing step. FIG. 6 corresponds to a case where, without carrying out the preheating treatment prior to the collapsing step, the collapsing and fusion was done immediately after the CVD in the step (i), but where at the collapsing step, the fore end of the quartz tube was tightly closed and oxygen was passed through the quartz tube from the other end thereby to make the gaseous pressure in the quartz tube higher than the atmospheric pressure by about $1 \times 10^{-3}$ kg/cm$^2$. The baseband frequency characteristics of the optical fibers were measured. As the result, the transmission bandwidths of the optical fibers by the prior arts as illustrated in FIGS. 4, 5 and 6 were 310 MHz·km, 600MHz·km and 400 MHz·km, respectively. In contrast, the transmission bandwidth of the optical fiber according to this invention as produced by Example 1 was 720 MHz·km, and sufficiently higher and better characteristics over the cases of the prior arts were obtained. Now, further comparisons will be made between FIG. 2, indicative of the result of Example 1 and FIGS. 4–6, indicative of the results of the prior art. In the case of FIG. 4, that area of the central part of the fiber section in which the refractive index is decreased is large, and moreover, the amount of decrease of the refractive index is large. The optical fiber of such characteristics is unfavorable to the extreme. In the case of FIG. 5, that area of the central part of the section in which the refractive index is decreased is fairly large. Moreover, the maximum value of the refractive index becomes considerably higher than a design value (a salience 11 is seen in the graph), and a disturbance develops in the characteristics. The characteristics are therefore unfavorable, too. The case of FIG. 6 is also unfavorable because that area of the central part of the section in which the refractive index is decreased is large. Moreover, the shape of the refractive index curve protrudes at the central part to form a salience 12, and although the salience raises the refractive index at the center to some extent, its value is unstable and lacking in controllability. In contrast, in the case of Example 1 illustrated in FIG. 2, that area of the central part in which the refractive index is decreased is small. Besides, the shape of the refractive index curve includes no protrusion and is stable. The optical fiber of this invention is therefore favorable.

Example 2

On the basis of the fact that the vaporization of the dopant is dependent upon the heating temperature during the collapsing and upon the density of the deposited glass film, and the fact found out by the inventors that the vaporized dopant diffuses into the glass film again by putting the glass tube into a closed system during the collapsing, according to the present example, as described in Example 1 a heat treatment is conducted before the collapsing and while a compound gas, from which an oxide enhancing the refractive index is precipitated by the CVD process, is kept flowing through the glass tube, thereby to densify the deposited film and to suppress and compensate for the vaporization of the dopant from the core material, whereupon as a distinct feature of the present example one end of the glass tube is sealed and the heating and collapsing is done while applying a fixed pressure into the tube from the other end with an oxidizing or inert gas, thereby intending to improve the drawback of the lowering of the refractive index at the central part of the optical fiber.

Hereunder, this example will be described with reference to FIG. 1.

A quartz tube (14 mm in the outside diameter, 1 mm in the wall thickness, and 120 cm in the total length) was used as a hollow glass tube 2. Besides the quartz tube, a Vycor tube etc. is usually employed (Vycor: trademark of products by Corning Glass Works in U.S.). While rotating the quartz tube on a glass lathe and at 40 r.p.m. in the direction of arrow 4 (or in the opposite direction), a source gas for forming a glass film was introduced into the quartz tube 2 as indicated by arrow 1, and a heating source 3 (an electric furnace, an oxyhydrogen burner etc. can be employed) was reciprocated in the directions of arrows 6 and 6'. Thus, the glass film 5, which will become a core material of an optical fiber, was deposited onto the inner wall surface of the hollow glass tube 2. In the present example, the vapors of SiCl$_4$, BBr$_3$ and GeCl$_4$, mixed with oxygen gas, were used as the source gas for forming the glass film. SiCl$_4$, BBr$_3$ and GeCl$_4$ were received in bubblers held at 20° C., respectively. SiCl$_4$ was bubbled by passing oxygen therethrough at a rate of 384 cc/min., while BBr$_3$ was bubbled by passing oxygen therethrough at a rate of 288 cc/min. GeCl$_4$ was bubbled by passing oxygen therethrough in a range of 0–290 cc/min. according to a prearranged program. Separately, oxygen at a rate of 240 cc/min. was fed in as a carrier gas. Using an oxyhydrogen burner as the heating source 3, the quartz tube was heated to 1050° C. (in a value indicated by an optical pyrometer) and was reciprocated 36 times. In this case, the moving speeds in the directions 6 and 6' were 4.0 mm/sec. and 15 mm/sec., respectively. In this manner, the $GeO_2$—$B_2O_3$—$SiO_2$ glass film (exhibiting a specific refractive index difference of $-0.24$ to 0.30% with respect to quartz) was deposited with a thickness of about 220 microns on the inner wall surface of the quartz tube. Subsequently, the reaction gas was cut off, and while bubbling only $GeCl_4$ with oxygen at 4 cc/min. and separately feeding oxygen at 600 cc/min. as a carrier gas, the quartz tube 2 was heated by the oxyhydrogen burner. At this time, the heating power of the burner was made more intense than at the CVD of the preceding step, and the burner was reciprocated five times at a heat treatment temperature of 1400°–1480° C. (in a value indicated by the optical pyrometer). The moving speeds of the burner 3 in the directions 6 and 6' in this case were 2.5 mm/sec. and 15 mm/sec., respectively. Although, in this heat treatment previous to the collapsing and fusion of the glass tube subjected to the CVD, the outside diameter of the glass tube somewhat decreases, this previous treatment differs from the so-called collapsing step.

Subsequently, one end 7 of the quartz tube was sealed, and oxygen gas was introduced as indicated by arrow 1, to make the internal pressure of the tube slightly higher than the pressure of the external air (the pressure difference was about $1 \times 10^{-3}$ $kg/cm^2$). While holding this state, the heating and collapsing was carried out. The collapsing was executed by reciprocating the burner two times, to obtain an optical fiber preform. Concrete conditions at that time were 0.6 mm/sec. in the burner moving speed (in the direction 6') and 1600° C. in the heating temperature (in a value indicated by the optical pyrometer), and 0.2 mm/sec. (in the direction 6') and 1650° C. The burner was moved speedily in the direction 6. The preform thus fabricated was heated and drawn by the use of an electric furnace whereby a focusing type optical fiber having an outside diameter of 120 microns was obtained. The refractive index profile of a section of the optical fiber was measured with an interference microscope, and the result is given in FIG. 3. This optical fiber had a transmission bandwidth of 765 MHz·km, which is more excellent than the value of the optical fiber produced by Example 1. As apparent from FIG. 3, in the optical fiber produced by the present example, the sectional area of that portion near the center in which the refractive index is decreased is small (this point is substantially equivalent to the optical fiber of Example 1). Furthermore, a swell 13 in the refractive index lies in the vicinity of the axis, and the lowering of the refractive index is extremely small (this point is more excellent than the optical fiber of Example 1). Therefore, the optical fiber according to Example 2 is very favorable. In this case, the swell of the refractive in the vicinity of the axis was stable. In this manner, the optical fiber produced by the present example has more excellent characteristics than those of the optical fiber of Example 1.

In the above examples, there has been stated the case of employing the mixture gas consisting of $GeCl_4$ and oxygen as the atmosphere during the heat treatment after the CVD. However, it has been revealed by a study separately made that dopants capable of rendering the refractive index higher than that of quartz glass, for example, $PCl_3$, $POCl_3$, $TiCl_4$, $AlCl_3$ etc. have similar effects.

As set forth above, with the method of producing optical fiber according to this invention, the decrease of the refractive index at the central part of the optical fiber can be sharply diminished, and the invention is effective to sharply improve the transmission characteristics, especially the transmission bandwidth characteristics.

What is claimed is:

1. A method of producing optical fiber, wherein a glass film is deposited by chemical vapor reaction on the inner wall surface of a glass tube, an optical preform is produced from said glass tube by heating and collapsing said glass tube, and an optical fiber is produced from said preform by heating and drawing said optical preform, comprising the steps of:
   (i) depositing a glass film having a dopant therein, for enhancing the refractive index of said glass film, onto an inner wall surface of a glass tube by a chemical vapor reaction, said depositing taking place at a temperature up to 1100° C., whereby a glass film having a dopant therein and having a desired refractive index or refractive index profile is deposited on said inner wall surface;
   (ii) heating the glass tube, having the glass film, with the dopant therein and with a desired refractive index or refractive index profile, on an inner wall surface of said tube, to a temperature between 1400°–1500° C., passing a gas through said tube, said gas consisting essentially of (a) a compound gas which can be oxidized, at said temperature between 1400°–1500° C., to form an oxide which enhances the refractive index of said glass film, and (b) an oxidizing gas, and forming and precipitating on said glass film a precipitate consisting essentially of said oxide which enhances the refractive index of said glass film, said forming and precipitating occurring during said passing said gas through said tube, whereby the deposited glass film having a dopant therein is densified and the evaporation of the dopant from said glass film while producing said optical preform by heating and collapsing said glass tube is suppressed and compensated for;
   (iii) heating said glass tube to a temperature between 1550°–1650° C. and collapsing said tube at this temperature between 1550°–1650° C., whereby a solid optical perform is produced; and
   (iv) heating and then drawing said solid optical preform to form said optical fiber.

2. A method of producing optical fiber according to claim 1, wherein in the step iii), one end of said glass tube is sealed and a gas is introduced into said glass tube from the other end thereof, to slightly raise the pressure in said glass tube.

3. A method of producing optical fiber according to claim 1, wherein said glass tube is a quartz tube.

4. A method of producing optical fiber according to claim 1, wherein in the step (ii), oxygen is employed as said oxidizing gas.

5. A method of producing optical fiber according to claim 1, wherein in the step (ii), at least one gas selected from the group consisting of $GeCl_4$, $PCl_3$, $POCl_3$, $TiCl_4$ and $AlCl_3$ is employed as said compound gas.

6. A method of producing optical fiber according to claim 3, wherein in the step (ii), oxygen is employed as said oxidizing gas, and at least one gas selected from the group consisting of $GeCl_4$, $PCl_3$, $POCl_3$, $TiCl_4$ and $AlCl_3$ is employed as said compound gas.

7. A method of producing optical fiber according to claim 2, wherein in the step (iii), the pressure in said glass tube is raised to a pressure p (in $kg/cm^2$) of the gas in said glass tube, said pressure p calculated by an equation of $p=k/r$ (where k denotes a constant, and r denotes ½ of an inside diameter (in cm) of said glass tube), and the constant k is made $k \leq 7.5 \times 10^{-4}$.

8. A method of producing optical fiber according to claim 7, wherein the constant k is made $k \leq 6 \times 10^{-4}$.

9. A method of producing optical fiber according to claim 1, wherein said glass film is an $SiO_2$ film.

10. A method of producing an optical fiber preform, wherein a glass film is deposited by chemical vapor reaction on the inner wall surface of a glass tube and an optical preform is produced from said glass tube by heating and collapsing said glass tube, comprising the steps of:
(i) depositing a glass film having a dopant therein, for enhancing the refractive index of said glass film, onto an inner wall surface of a glass tube by a chemical vapor reaction, said depositing taking place at a temperature up to 1100° C., whereby a glass film having a dopant therein and having a desired refractive index or refractive index profile is deposited on said inner wall surface;
(ii) heating the glass tube, having the glass film, with the dopant therein and with a desired refractive index or refractive index profile, on an inner wall surface of said tube, to a temperature between 1400°–1500° C., passing a gas through said tube, said gas consisting essentially of (a) a compound gas which can be oxidized, at said temperature between 1400°–1500° C., to form an oxide which enhances the refractive index of said glass film, and (b) an oxidizing gas, and forming and precipitating on said glass film a precipitate consisting essentially of said oxide which enhances the refractive index of said glass film, said forming and precipitating occurring during said passing said gas through said tube, whereby the deposited glass film having a dopant therein is densified and the evaporation of the dopant from said glass film while producing said optical preform by heating and collapsing said glass tube is suppressed and compensated for; and
(iii) heating said glass tube to a temperature between 1550°–1650° C., and collapsing said tube at this temperature between 1550°–1650° C. into a solid body in the shape of a rod.

11. A method of producing optical fiber according to claim 1, wherein said dopant in said glass film is at least one of the compounds selected from the group consisting of oxides of boron, germanium, phosphorus, titanium, fluorine, barium and aluminum.

12. A method of producing optical fiber according to claim 1, wherein said gas passed through said tube in (ii) consists of said compound gas and said oxidizing gas, and said precipitate consists of said oxide.

13. A method of producing optical fiber preform according to claim 10, wherein said gas passed through said tube in (ii) consists of said compound gas and said oxidizing gas, and said precipitate consists of said oxide.

14. A method of producing optical fiber, wherein a glass film is deposited by chemical vapor reaction on the inner wall surface of a glass tube, an optical preform is produced from said glass tube by heating and collapsing said glass tube, and an optical fiber is produced from said preform by heating and drawing said optical preform, comprising the steps of:
(i) depositing a glass film having a dopant therein, for enhancing the refractive index of said glass film, onto an inner wall surface of a glass tube by a chemical vapor reaction, whereby a glass film having a dopant therein and having a desired refraction index or refractive index profile is deposited on said inner wall surface;
(ii) heating the glass tube, having the glass film, with the dopant therein and with a desired refractive index or refractive index profile, on an inner wall surface of said tube, to a temperature which is sufficiently high to permit densification of the deposited glass film yet is low enough so that the glass tube does not collapse, passing a gas through said tube, said gas consisting of (a) a compound gas which can be oxidized, at said temperature of said tube, to form an oxide which enhances the refractive index of said glass film, and (b) an oxidizing gas, and forming the precipitating on said glass film a precipitate consisting of said oxide which enhances the refractive index of said glass film, said forming and precipitating occurring during said passing said gas through said tube, whereby only said oxide is formed and precipitated on said glass film having a dopant therein, whereby the deposited glass film having a dopant therein is densified and the evaporation of the dopant from said glass film while producing said optical preform by heating and collapsing said glass tube is suppressed and compensated for;
(iii) heating said glass tube to a temperature at which said tube can be collapsed and collapsing said tube at this temperature, whereby a solid optical preform is produced; and
(iv) heating and then drawing said solid optical preform to form said optical fiber.

15. A method of producing an optical fiber preform, wherein a glass film is deposited by chemical vapor reaction on the inner wall surface of a glass tube and an optical preform is produced from said glass tube by heating and collapsing said glass tube, comprising the steps of:
(i) depositing a glass film having a dopant therein, for enhancing the refractive index of said glass film, onto an inner wall surface of a glass tube by a chemical vapor reaction, whereby a glass film having a dopant therein and having a desired refractive index or refractive index profile is deposited on said inner wall surface;
(ii) heating the glass tube, having the glass film, with the dopant therein and with a desired refractive index or refractive index profile, on an inner wall surface of said tube, to a temperature which is sufficiently high to permit densification of the deposited glass film yet is low enough so that the glass tube does not collapse, passing a gas through said tube, said gas consisting of (a) a compound gas which can be oxidized, at said temperature of said tube to form an oxide which enhances the refractive index of said glass film, and (b) an oxidizing gas, and forming and precipitating on said glass film a precipitate consisting of said oxide which enhances the refractive index of said glass film, said forming and precipitating occurring during said passing said gas through said tube, whereby only said oxide is formed and precipitated from said gas on said glass film having a dopant therein, whereby the deposited glass film having a dopant therein is densified and the evaporation of the dopant from said glass film while producing said optical preform by heating and collapsing said glass tube is suppressed and compensated for; and (iii) heating said glass tube to a temperature between 1550°–1650° C., and collapsing said tube at this temperature between 1550°–1650° C. into a solid body in the shape of a rod.

16. A method of producing an optical fiber preform according to claim 10, wherein, in the step (ii), at least one gas selected from the group consisting of $GeCl_4$, $PCl_3$, $POCl_3$, $TiCl_4$ and $AlCl_3$ is employed as said compound gas.

17. A method of producing an optical fiber preform according to claim 10, wherein, in the step (ii), the glass tube is heated, while it is being rotated, by a heating source traversing the length of the glass tube.

18. A method of producing an optical fiber preform according to claim 17, wherein the heating source traverses the length of the glass tube in both directions, at a speed of 1 mm/sec to 5 mm/sec in one direction and a speed of at least 10 mm/sec in the other direction.

19. A method of producing an optical fiber preform according to claim 18, wherein the heating source reciprocates its traversal of the glass tube at most 10 times.

20. A method of producing an optical fiber preform according to claim 10, wherein said dopant in said glass film is at least one of the compounds selected from the group consisting of oxides of boron, germanium, phosphorus, titanium, fluorine, barium and aluminum.

* * * * *